US012636677B2

(12) United States Patent
Bhattacharjee

(10) Patent No.: US 12,636,677 B2
(45) Date of Patent: May 26, 2026

(54) PRECISION POWDER COATING BATCH SYSTEM

(71) Applicant: SWIMC LLC, Cleveland, OH (US)

(72) Inventor: Sudip Bhattacharjee, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 101 days.

(21) Appl. No.: 18/406,554

(22) Filed: Jan. 8, 2024

(65) Prior Publication Data

US 2024/0181490 A1 Jun. 6, 2024

Related U.S. Application Data

(63) Continuation of application No. 17/315,828, filed on May 10, 2021, now Pat. No. 11,904,346.
(Continued)

(51) Int. Cl.
*B01F 35/21* (2022.01)
*B01F 33/84* (2022.01)
(Continued)

(52) U.S. Cl.
CPC ............ *B05C 19/06* (2013.01); *B01F 33/848* (2022.01); *B01F 35/2207* (2022.01);
(Continued)

(58) Field of Classification Search
CPC ............................ B05C 19/06; B01F 35/2112
See application file for complete search history.

(56) References Cited

U.S. PATENT DOCUMENTS 6,146,145 A 11/2000 Itakura et al.
6,360,691 B1 * 3/2002 Laue .................... B08B 9/0322
119/57.92
(Continued)

OTHER PUBLICATIONS

Information sheet, "Case History: Catalyst Processing", Applicon, Indianapolis, Indiana, 2 pages. No date available, believed to be available as early as Mar. 31, 2020. Available on the internet at http://www.appliconco.com/case_history_catalyst_processing.html. Retrieved online Jul. 11, 2022.

*Primary Examiner* — Jason K Niesz
(74) *Attorney, Agent, or Firm* — Mueting Raasch Group

(57) ABSTRACT

A multi-tiered precision powder coating batch system configured to enable simultaneous preparation of a first and second batch of powder coatings. The multi-tiered precision powder coating batch system including a plurality of storage bins configured to store a corresponding plurality of raw materials for preparation of batches of powder coatings, each of the storage bins including an automated dispenser configured to dispense a desired quantity of raw material within the storage bins into a corresponding first raw material container located on a first tier, and a second raw material container located on a second tier, and a robotic arm configured to sequence a transfer of the raw material contents of the first tier raw material containers into a first tier mixing container for preparation of a first batch of a powder coating, and to sequence a transfer of the raw material contents of the second tier raw material containers into a second tier mixing container for a simultaneous preparation of a second batch of a powder coating.

20 Claims, 8 Drawing Sheets

Related U.S. Application Data

(60) Provisional application No. 62/704,451, filed on May 11, 2020.

(51) Int. Cl.
*B01F 35/22* (2022.01)
*B05B 15/20* (2018.01)
*B05C 19/06* (2006.01)

(52) U.S. Cl.
CPC .......... *B05B 15/20* (2018.01); *B01F 35/2112* (2022.01); *B01F 35/2117* (2022.01)

(56) References Cited

U.S. PATENT DOCUMENTS

| | | | | |
|---|---|---|---|---|
| 7,649,034 | B2 | 1/2010 | Ladatto et al. | |
| 7,691,451 | B2 | 4/2010 | Ohkoshi et al. | |
| 7,867,555 | B2 | 1/2011 | O'Dell et al. | |
| 9,156,996 | B2 | 10/2015 | O'Dell et al. | |
| 9,528,007 | B2 | 12/2016 | O'Dell et al. | |
| 2014/0185404 | A1* | 7/2014 | Nagler, Jr. | C04B 28/02 366/8 |
| 2017/0158870 | A1 | 6/2017 | O'Dell et al. | |
| 2021/0346961 | A1* | 11/2021 | Mottin | B22F 3/003 |

* cited by examiner

PRECISION POWDER COATING BATCH SYSTEM

RELATED APPLICATION

This is a continuation application of U.S. patent application Ser. No. 17/315,828, filed May 10, 2021, which claims the benefit under 35 U.S.C. § 119 of U.S. Provisional Application Ser. No. 62/704,451, filed May 11, 2020, and titled PRECISION POWDER COATING BATCH SYSTEM, which are incorporated herein by reference in their entireties.

TECHNICAL FIELD

The present disclosure relates generally to powder coating manufacturing systems and methods, and more particularly to a high production precision powder coating batch system configured to produce multiple batches of powder coatings simultaneously.

BACKGROUND

First pioneered in the 1950s, powder coatings are fast becoming one of the preferred finish processes in an increasing variety of products in nearly every major manufacturing industry today. Powder coatings have a number of advantages over other organic finishes. In particular, powder coatings are generally considered more durable and resistant to corrosion, chemicals and weather than traditional wet solvent-based paint coatings. Powder coatings are well known as providing a consistent, uniform coating, as unlike liquid based coatings, power coatings are not prone to run or drip during application. With lower coverage per square area costs than most other finishes, power coatings are also associated with lower operational costs. Additionally, powder coatings are considered more environmentally friendly, as they contain no solvents, they emit little, if any, volatile organic compounds (VOCs) into the atmosphere, and meet all Environmental Protection Agency requirements for air and water pollution control.

Powder coatings are generally manufactured in a multi-step process. Various ingredients, which may include resins, curing agents, pigments, additives, and fillers are dry blended to form a premix. This premix is then fed into an extruder, which uses a combination of heat, pressure, and sheer to melt and thoroughly mix the ingredients. As the ingredients are mixed together in a melted form during the extrusion process, the various color pigments blend to produce a uniform color. The extrudate is cooled and then ground into a powder. Depending on the desired coating and use, the grinding conditions are typically adjusted to achieve a powder median particle size of about 25-150 μm.

The final powder may then be applied to a metal substrate or electrically conductive article. The process begins with pretreatment/surface preparation of the substrate. The surface of the substrate is cleaned, removing grease, dirt and anything else that might interfere with the powder coating process. Typically this includes the use of abrasives or chemicals to clean and etch the surface of the substrate to remove any rust or existing coatings, and to prepare the surface for powder coating adhesion. Following pretreatment/surface preparation, the article is dried, for example by various air drying methods or in an oven setting. Once the article is completely dry, the powder coating may be applied.

The powder is electrically charged to a predetermined polarity by friction or corona discharge, giving each particle of the powder a negative charge. As the final power is applied, typically through a fluidized bed or spray technique, the article to be coated is grounded to electrostatically attract the charged powder particles. The result is a uniform coating of dry powder clinging to the article.

After coating, the coated article or product is heated, often in a curing oven. This heating step causes the powder particles to melt, flow together, and in some cases form a chemically reacted cross-linking of the particles to produce a smooth durable powder coat finish. The article or product is then removed from the oven, cooled, and put into service.

A characteristic and limitation of powder coatings that is different from solvent-based paints is that when powder coatings of two different colors are blended together, the resultant finish typically has a speckled appearance rather than being uniform in color. For example, if a white powder coating is mixed or contaminated with a black powder coating, the final coating applied on an article will have a black-and-white speckled appearance, rather than a uniform gray color finish.

Accordingly, in order to maintain a desired finish color and consistency, each batch of powder coating composition must be kept separate from other powder compositions during all stages of manufacturing. As a result, most powder coatings are produced one batch at a time, which has important implications on the economics of powder coatings manufacture. Failure to keep the batches separate, and any type of contamination may result in quality control issues, ultimately ending in product waste. For this reason, it is difficult, time-consuming and expensive to accurately produce large production quantity batches and small batches of any particular powder coating color. In many cases, the economics of powder coating manufacture may not justify the production of small batches, particularly of specialized colors.

SUMMARY OF THE DISCLOSURE

Embodiments of the present disclosure provide a multi-tiered precision powder coating batch system configured to enable simultaneous preparation of multiple batches of powder coating. Moreover, embodiments of the present disclosure can be configured to automate the preparation of batches of powder coatings in a precise, repeatable manner, while isolating precisely measured raw materials from one another until they are emptied into a mixing container in a specific order, thereby both reducing the amount of labor necessary to produce each batch, as well as improving quality control and reducing material usage losses.

One embodiment of the present disclosure provides a multi-tiered precision powder coating batch system, including a plurality of storage bins and a robot, such as a robotic arm. The plurality of storage bins can be configured to store a corresponding plurality of raw materials for preparation of batches of powder coatings. Each of the storage bins can include an automated dispenser configured to dispense a desired quantity of raw material within the storage bins into a corresponding first raw material container located on a first tier, and a second raw material container located on a second tier, wherein the desired quantity of raw material dispensed into the first and second raw material containers is determined by a sensed or measured weight of the respective first and second raw material containers. The robotic arm can be configured to sequence a transfer of the raw material contents of the first tier raw material containers into a first tier mixing container for preparation of a first batch of a powder coating, and to sequence a transfer of the raw material contents of the second tier raw material containers into a second tier mixing container for a simultaneous preparation of a second batch of a powder coating.

In one exemplary embodiment, the first tier can be scaled for preparation of batch sizes of 50 pounds or more, and the second tier can be scaled for preparation of batch sizes of less than 50 pounds. In one embodiment, the multi-tiered precision powder coating batch system can be configured to receive instructions to initiate preparation of the batches of powder coating. In one embodiment, the instructions to initiate preparation of the batch of powder coating are received by at least one of scanning a code or entering a batch script number into a user interface. In one embodiment, the user interface can be on a peripheral computing device in communication with a central processor.

In one embodiment, each raw material container can be specific to one storage bin of the plurality of storage bins as an aid in minimizing inadvertent contamination between batches of powder coatings. In one embodiment, the multi-tiered precision powder coating batch system can include at least two banks of a plurality of storage bins. In one embodiment, the multi-tiered precision powder coating batch system can include a dust collector configured to collect airborne particles within the multi-tiered precision powder coating batch system. In one embodiment, each of the storage bins can include a low-level sensor configured to send a notification via a user interface when a quantity of raw material within each storage bin falls below a defined threshold.

In one embodiment, the multi-tiered precision powder coating batch system can also include a conveyor assembly configured to transport the mixing container for further processing. In one embodiment, the transfer sequence of raw materials into the mixing container can be based on an expected dispense time of the raw materials from the storage bins. In one embodiment, the transfer sequence of raw materials into the mixing container can be completed according to a specific order intended to at least one of produce a more homogeneous mixture of the mixed raw materials, or reduce the mixing time to achieve a desired degree of homogeneity of a powder coating formula.

Another embodiment of the present disclosure provides a mobile, automated precision powder coating batch system configured to fit within the confines of an 8 foot×40 foot shipping container or trailer. The mobile, automated precision powder coating batch system can include a plurality of storage bins and a robotic arm. The plurality of storage bins can be configured to store a corresponding plurality of raw materials for preparation of a batch of powder coating, each of the storage bins including an automated dispenser configured to dispense a desired quantity of raw material within the storage bin into a corresponding raw material container, wherein the desired quantity of raw material dispensed into the raw material container is determined by a sensed weight of the raw material container. The robotic arm can be configured to sequence a transfer of the raw material contents of the raw material containers into a mixing container.

Yet another embodiment of the present disclosure provides a fully automated precision powder coating system, including plurality of storage bins, a robotic arm, and a central processor. The plurality of storage bins can be configured to store a corresponding plurality of raw materials for preparation of a batch of powder coating. Each of the storage bins can include an automated dispenser configured to dispense a desired quantity of raw material within the storage bin into a corresponding raw material container, wherein the desired quantity of raw material dispensed into the raw material container is determined by a sensed weight of the raw material container. The robotic arm can be configured to sequence a transfer of the raw material contents of the raw material containers into a mixing container. The central processor can be configured to receive instructions to initiate preparation of the batch of powder coating, whereupon receipt of the instructions, the central processor instructs the automated dispensers to dispense the desired quantities of raw materials into the raw material containers, and instructs the robotic arm to transfer the raw material contents of the raw material containers to the mixing container according to a defined batch script.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
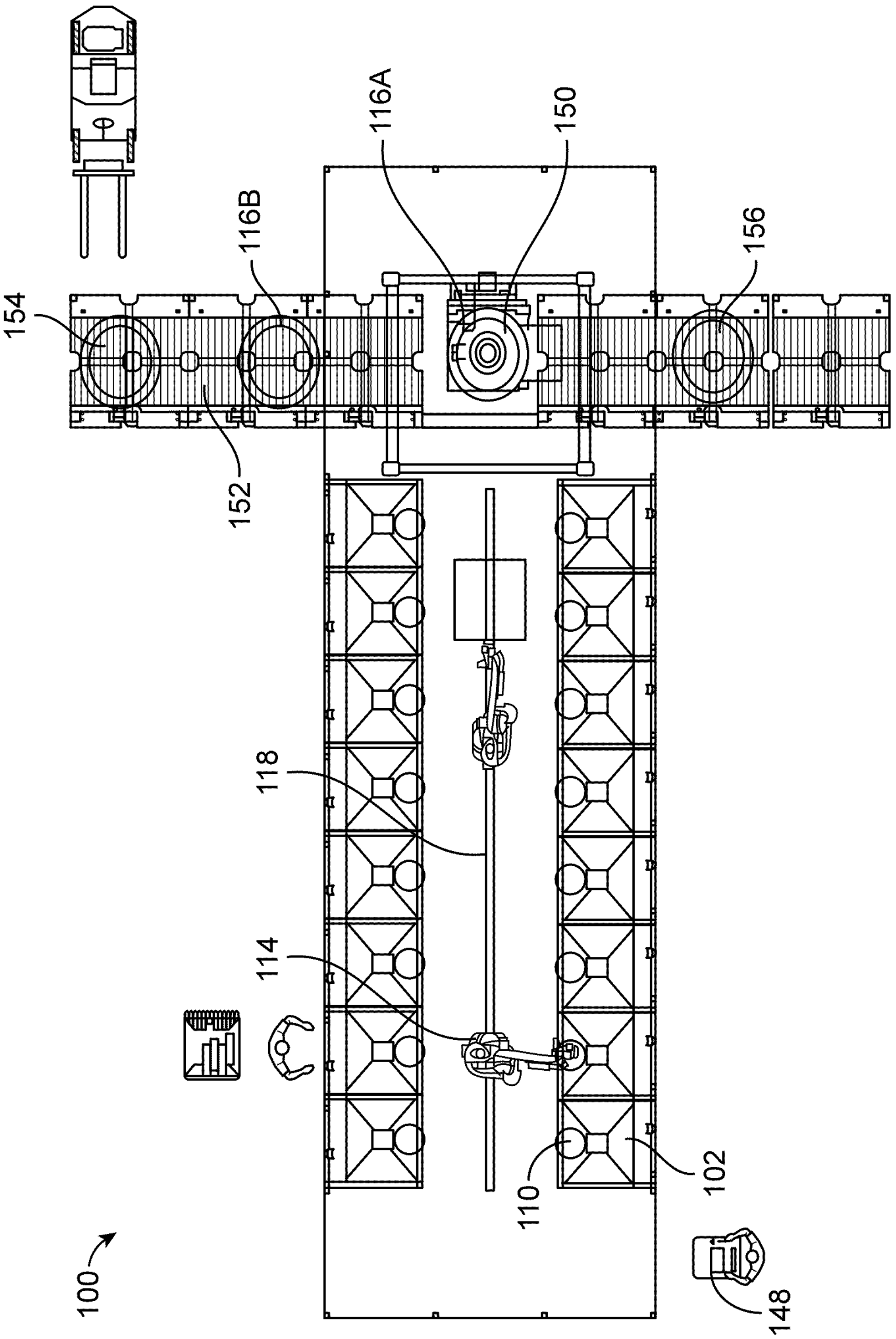
FIG. 1 is a diagram depicting a precision powder coating batch system configured to autonomously measure and sequence the transfer of desired quantities of raw material into a mixing container for the preparation of one or more batches of powder coating, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, a precision powder coating batch system 100 configured to simultaneously measure and autonomously sequence the transfer of desired quantities of raw material into a mixing container for the preparation of a batch of one or more batches of powder coating is depicted in accordance with an embodiment of the disclosure. In some embodiments, the precision powder coating batch system 100 can be configured to execute the batch preparation according to a defined batch script, which can be initiated by entering a batch script number into a user interface, scanning a batch script code, or the like. Accordingly, in some embodiments, the precision powder coating batch system 100 can be configured to automate the process of powder coating batch preparation from a variety of suppliers, including SHERWIN-WILLIAMS, PPG, AKZO NOBEL, BEHR, NIPPON PAINT, and CLARIENT, just to name a few. Moreover, the precision powder coating batch system 100 can be configured to simultaneously prepare multiple batches of powder coatings in a precise, repeatable manner, while isolating the precisely measured raw materials from one another until they are emptied into the mixing chamber in a specific order, thereby both reducing the amount of labor necessary to produce each batch, as well as improving quality control and reducing material usage losses.

In some embodiments, the precision powder coating batch system 100 can include a plurality of raw material storage bins 102 configured to store a quantity of raw ingredients for use in preparation of powder coatings, which can include resins, curing agents, pigments, additives, fillers, and the like. With additional reference to FIG. 2, a perspective view of a raw material storage bin 102 is depicted in accordance with an embodiment of the disclosure.

Figure 2:
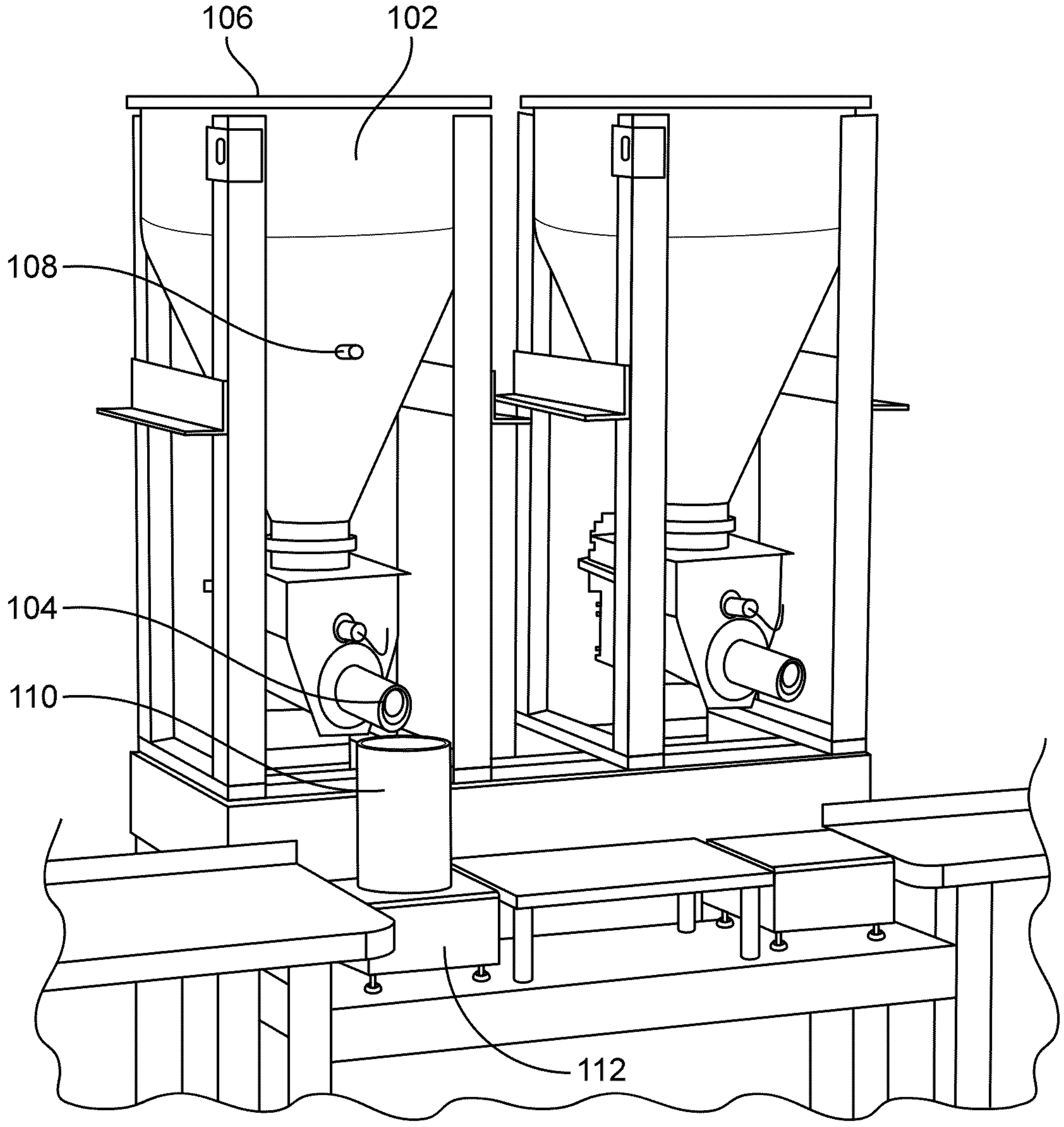
FIG. 2 is a perspective view depicting storage bins of a precision powder coating batch system, in accordance with an embodiment of the disclosure.

As depicted in FIG. 2, in some embodiments, the raw material storage bins 102 can be configured as a hopper having a funnel portion configured to naturally urge the raw materials therein towards an automated dispenser 104 under the force of gravity; although the use of other bin configurations, including both stationary and portable storage bins 102 is contemplated. In some embodiments, the automated dispenser 104 can be in the form of an automated rotary valve, volumetric screw feeder, vibratory or oscillating feeder, or the like, configured to dispense precise quantities of raw materials from the storage bin 102.

Each of the storage bins 102 can further include an inlet 106 configured to enable raw materials to be added to fill or replenish the storage bins 102 as needed. In some embodiments, the storage bins 102 can include a low-level sensor 108 configured to notify users when the quantity of raw material within a given storage bin 102 falls below a defined threshold.

Raw materials dispensed from the raw material storage bins 102 can be collected in a raw material container 110, which can be positioned on a load cell or other mass sensor 112. The sensors 112, which can be configured to monitor a weight of the raw material containers 110, can be in communication with the automated dispensers 104 to limit dispensation of raw materials from the storage bins 102 as an aid in ensuring that a desired quantity of raw material is dispensed into the raw material container 110. For example, in one embodiment, each of the mass sensors 112 can be configured to determine a tare weight of the raw material container 110 positioned on it. Thereafter, increases in weight, as detected by the mass sensor 112, can be associated with dispensed raw material.

In some embodiments, each of the raw material containers 110 can be specific to each raw material storage bin 102, such that only raw materials dispensed from a particular storage bin 102 contact the raw material container 110, thereby minimizing inadvertent contamination of powder coatings. In some embodiments, precise measurement of each of the raw materials of a batch of powder coating can be initiated by entering a batch script number into a user interface, scanning a code (e.g., QR code, barcode, etc.), or the like. Thereafter, the respective automated dispensers 104 of the raw material storage bins 102 can simultaneously begin dispensing precise quantities of each of the raw materials called for in the batch script.

Figure 3:
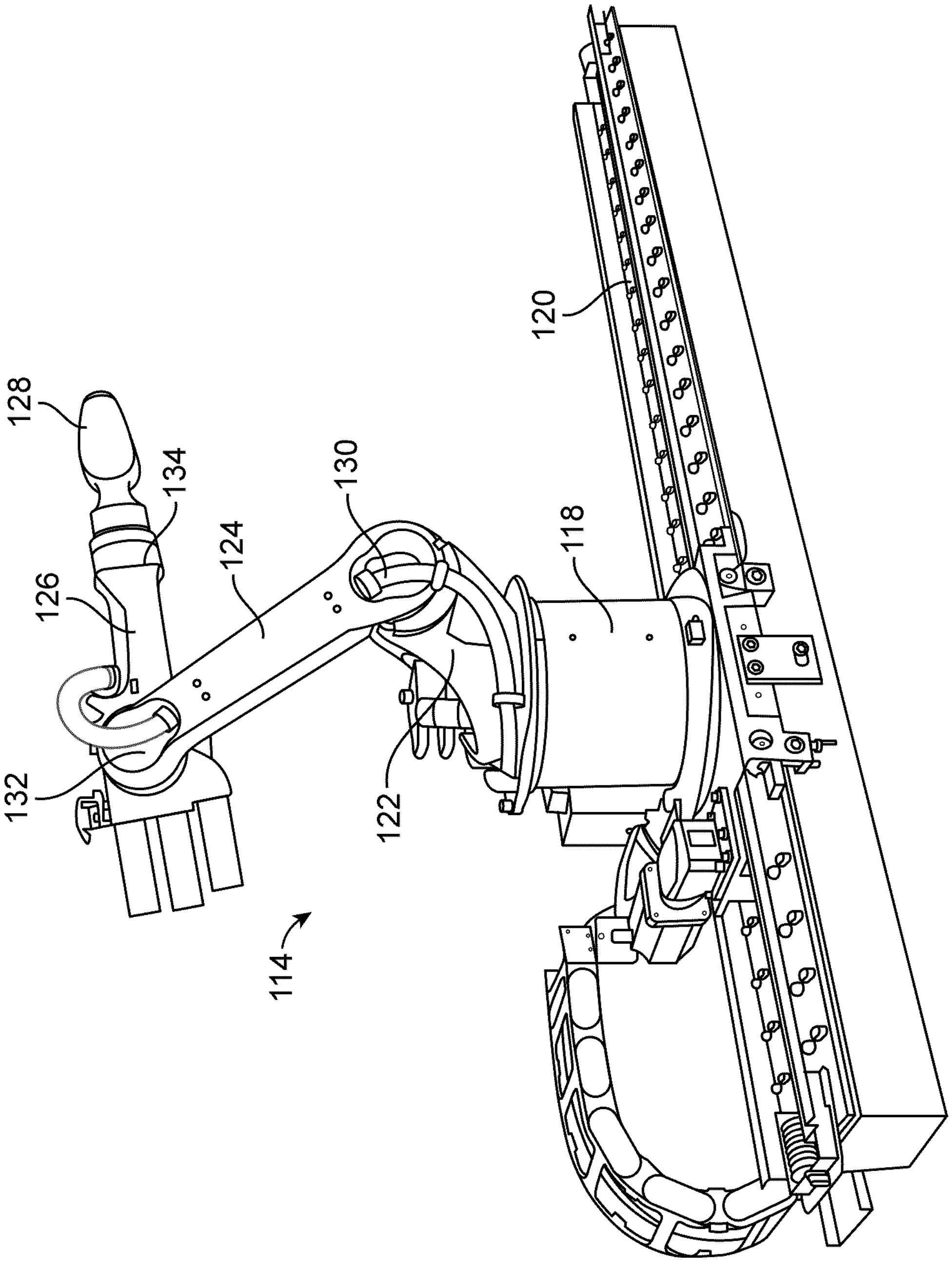
FIG. 3 is a perspective view depicting a robotic arm of a precision powder coating batch system, in accordance with an embodiment of the disclosure.

With continued reference to FIG. 1, in some embodiments, a robotic arm 114 can be configured to autonomously sequence a transfer of the raw materials from the raw material containers 110 into a mixing container 116. With additional reference to FIG. 3, a perspective view of a robotic arm 114 is depicted in accordance with an embodiment of the disclosure. In some embodiments, the robotic arm 114 can include a pivotable base 118 configured to enable the robotic arm 114 to rotate relative to a horizontal plane. In some embodiments, the base 118 of the robotic arm 114 can be operably coupled to a rail system 120 configured to translate, shift or move the robotic arm 114 relative to the horizontal plane. The use of other robotic arm mobility mechanisms to translate, shift or move the robotic arm 114 relative to the horizontal plane, such as an automated guided vehicle, are also contemplated. In other embodiments, for example in compact or portable precision powder coating batch systems, the robotic arm 114 can be mounted to a stationary platform, such that the base 118 of the robotic arm 114 is fixed within the precision powder coating batch system 100.

In some embodiments, the robotic arm 114 can include a first member 122, second member 124, third member 126, and gripping portion 128. In one embodiment, a first pivot 130 configured to rotate the second member 124 relative to the first member 122 within a given plane, can be positioned between the first member 122 and the second member 124. In one embodiment, a second pivot 132 configured to rotate the third member 126 relative to the second member 124 within a given plane, can be positioned between the second member 124 and the third member 126. In one embodiment, a third pivot 134 configured to rotate the gripping portion 128 about a longitudinal axis relative to the third member 126, can be positioned between the third member 126 and the gripping portion 128. In some embodiments, the gripping portion 128 can be a clamp, suction device, or other mechanism configured to selectively grip the raw material containers 110.

Accordingly, in some embodiments, the robotic arm 114 can be configured to autonomously sequence a transfer of precise measured quantities of raw materials from the respective storage bins 102 to the mixing container 116. In some embodiments, the transfer sequence of raw materials can be based on an expected dispensation time of each of the raw materials from the storage bins 102, with the first raw material to be fully dispensed into a raw material container 110 transferred first, and the last raw material to be fully dispensed into a raw material container 110 transferred last. Accordingly, in some embodiments, the transfer sequence can be designed to minimize the overall amount of time necessary to complete the preparation of any given batch of powder coating.

Figure 4:
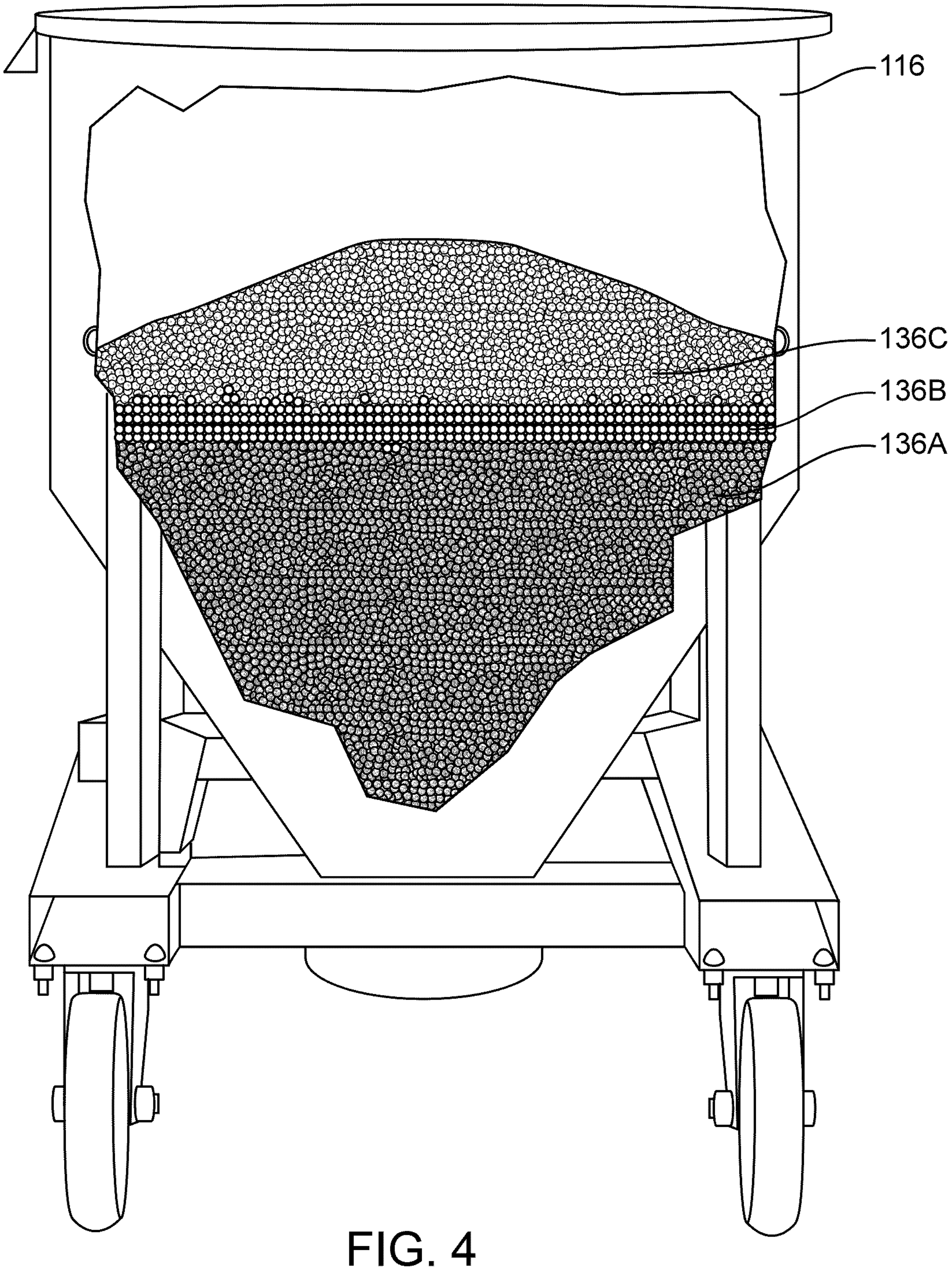
FIG. 4 is a partial, cutaway view depicting layers of raw material within a mixing container of a precision powder coating batch system, in accordance with an embodiment of the disclosure.

In other embodiments, the transfer sequence can be completed according to a prescribed batch script, particularly where it has been found that adding the raw materials to the mixing container 116 is a specific order achieves a more desirable outcome (e.g., a more homogeneous mixture of the final powder coating, reduced mixing time to achieve the same results, etc.). Referring to FIG. 4, a mixing container 116 containing a sequenced layer of raw materials 136A-C according to a prescribed batch script is depicted in accordance with an embodiment of the disclosure. In some embodiments, the raw materials 136 can be dispensed into the mixing container 116 in a layer having a substantially uniform thickness (such as that of raw material 136B). In some embodiments, the raw materials 136 can be dispensed into the mixing container 116 in the form of a cone, wherein a center of the raw material distribution has a greater thickness than the edges (such as that of raw material 136C). Other distributions of raw materials 136, such as an inverted cone, distribution of raw material 136 into a particular area of the mixing container 116, and the like, are also contemplated. In some embodiments, the transfer sequence of raw materials 136 can be determined according to one or more statistical approaches (e.g. a design of experiment), as an aid in optimizing the final powder coating mixture.

Figure 5:
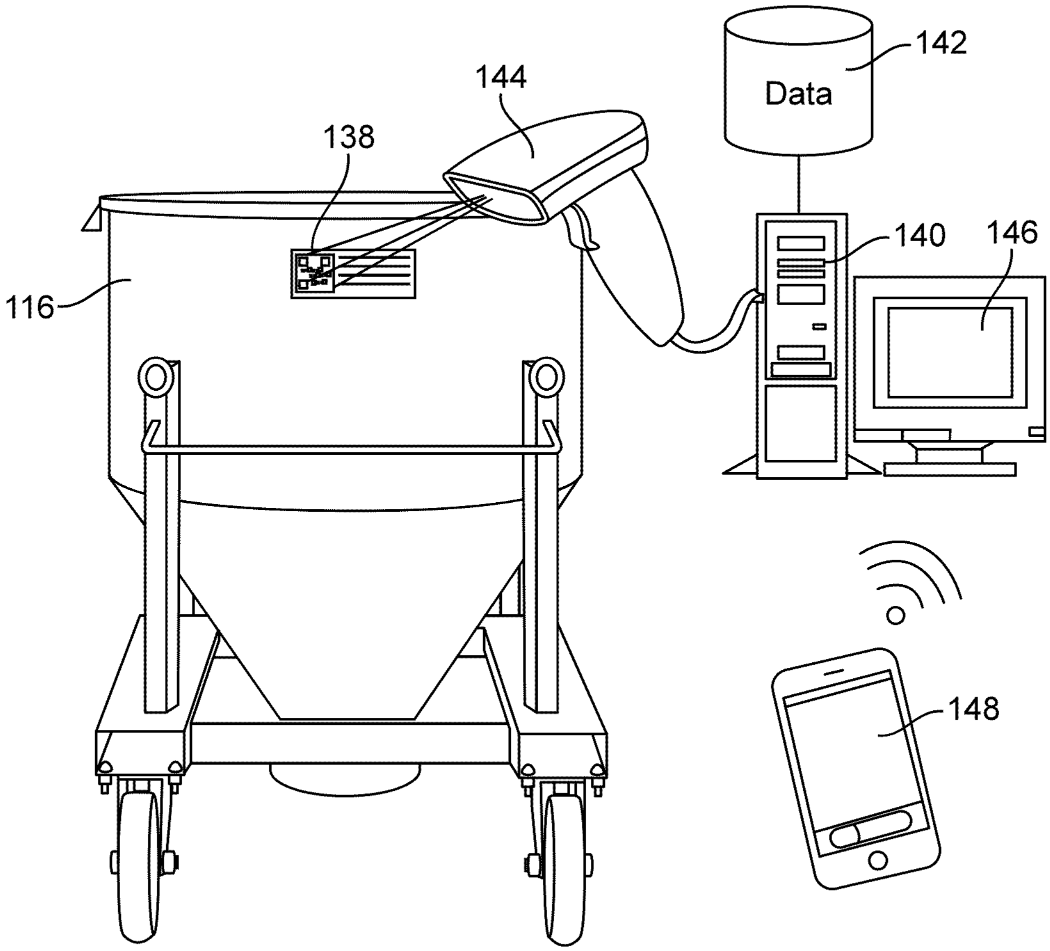
FIG. 5 is a schematic view depicting scanning of a QR code to initiate a batch script for preparation of a batch of powder coating by a precision powder coating batch system, in accordance with an embodiment of the disclosure.

With additional reference to FIG. 5, in some embodiments, the precision powder coating batch system 100 can be configured to initiate powder coating batch preparation by scanning a code 138 (e.g., QR code, barcode, etc.), which in some embodiments can be operably coupled to the mixing container 116. Other methods of initiating powder coating batch preparation, such as entering a batch script number into a user interface, or the like are also contemplated.

Accordingly, in some embodiments, the precision powder coating batch system 100 can include a central processor 140, database 142, optional scanner 144, and optional user interface 146. In some embodiments, one or more peripheral computing devices 148 can be configured to communicate with the central processor 140, through either a wired or wireless connection. For example, in some embodiments, the one or more peripheral computing devices 148 can be a mobile computing platform, such as a cellular telephone (as depicted in FIG. 5), tablet, laptop computer (as depicted in FIG. 1), or the like. Accordingly, in some embodiments, the one or more peripheral computing devices 148 can optionally serve as a user interface for configuration and manipulation of the precision powder coating batch system 100.

As depicted in FIG. 5, in some embodiments, the scanner 144 can be configured to scan a code 138 (e.g., QR code, barcode, etc.), thereby initiating the powder coating batch preparation procedure. For example, in some embodiments, a code 138 can be coupled to a cleaned mixing container 116, or a mixing container 116 designated for a particular powder coating mixture. Thereafter, the mixing container 116 can be positioned at a mixing station 150 (as depicted in FIG. 1), which in some embodiments can be configured to detect the presence of a mixing container 116. In some embodiments, upon detecting the presence of a mixing container 116, the scanner 144 can automatically scan the code 138, thereby initiating the powder coating batch preparation procedure. In other embodiments, the user can enter instructions into a user interface 146, 148, thereby initiating the powder coating batch preparation procedure.

Upon receipt of instructions to initiate the powder coating batch preparation procedure, the central processor 140/database 142 can look up the specific raw materials called for in the batch script and begin dispensing precise measured quantities of the raw materials into the respective raw material containers 110. For powder coating batch recipes calling for an unusual or not frequently used raw material or ingredient (e.g., not stored in one of the storage bins 102), the central processor 140 can be configured to prompt a user (e.g., via a user interface 146, 148) to manually add the desired quantity of raw material to the mixing container 116.

With continued reference to FIG. 1, once all of the raw materials have been added to the mixing container 116A, the raw materials can be mixed according to the batch script. In some embodiments, mixing of the raw materials can take place at the mixing station 150. Thereafter, the mixing container 116A can be transported to an extruder (not depicted) for further processing. In some embodiments, while the mixing of raw materials within a first mixing container 116A is occurring, the precision powder coating batch system 100 can be configured to scan a code 138 (depicted in FIG. 5) on a second mixing container 116B, thereby initiating a subsequent powder coating batch preparation procedure. Accordingly, in some embodiments, the precision powder coating batch system 100 can be configured to begin dispensing the raw materials for a second batch of powder coating, while a first batch of a powder coating is being mixed.

To facilitate transfer of mixing containers 116A-B to and from the mixing station 150, in some embodiments, the precision powder coating batch system 100 can include a conveyor assembly 152 configured to transport the mixing containers 116 from a loading station 154, through the mixing station 150, and onto a delivery station 156 for further processing. In some embodiments, the conveyor assembly 152 can be configured to direct the mixing containers 116A-B to a plurality of extruders (not depicted), thereby enabling simultaneous processing of multiple batches of powder coating. In smaller, more compact, and potentially systems 100 (such as that depicted in FIG. 6), the precision powder coating batch system 100 need not include a conveyor assembly 152. Rather, the mixing containers 116 can be manually positioned on the mixing station 150.

Figure 6:
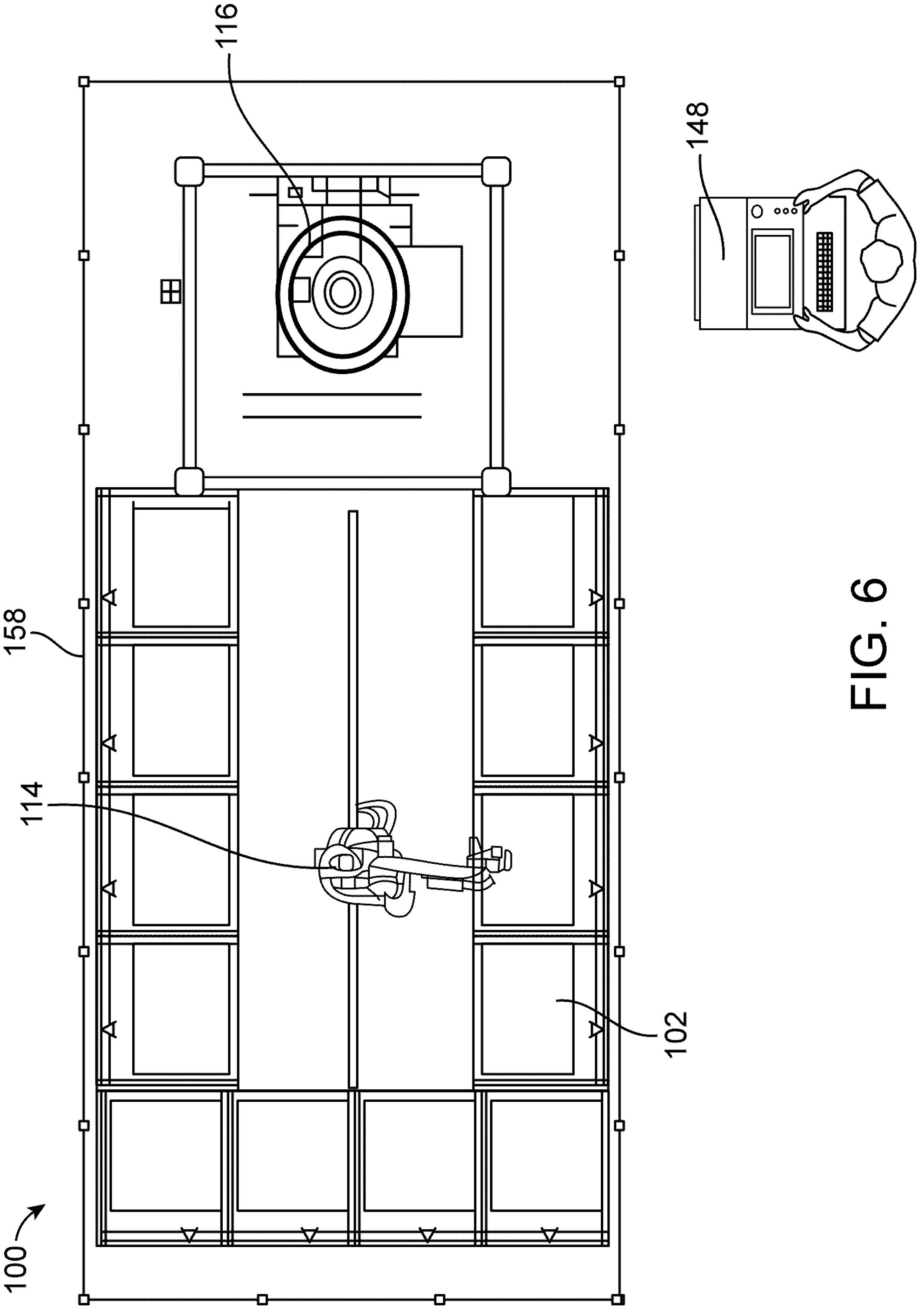
FIG. 6 is an architectural diagram depicting a mobile, automated precision powder coating batch system, in accordance with an embodiment of the disclosure.

In some embodiments, the precision powder coating batch system 100 can be horizontally scalable to include a greater or lesser number of storage bins 102. For example, as depicted in FIG. 6, in one embodiment, the precision powder coating batch system 100 can be configured to fit within the confines of a standard sized shipping container 158 for ease in transport. Accordingly, in some embodiments, the precision powder coating batch system 100 can have an architectural footprint measuring less than about 8 feet wide by about 40 feet long; other architectural footprint dimensions are also contemplated. In such embodiments, the self-contained, mobile precision powder coating batch system 100 can be wheeled into and out of a standard sized shipping container 158, for example with the aid of a forklift, thereby enabling easy in deployment of such systems 100 to a variety of locations.

Figure 7:
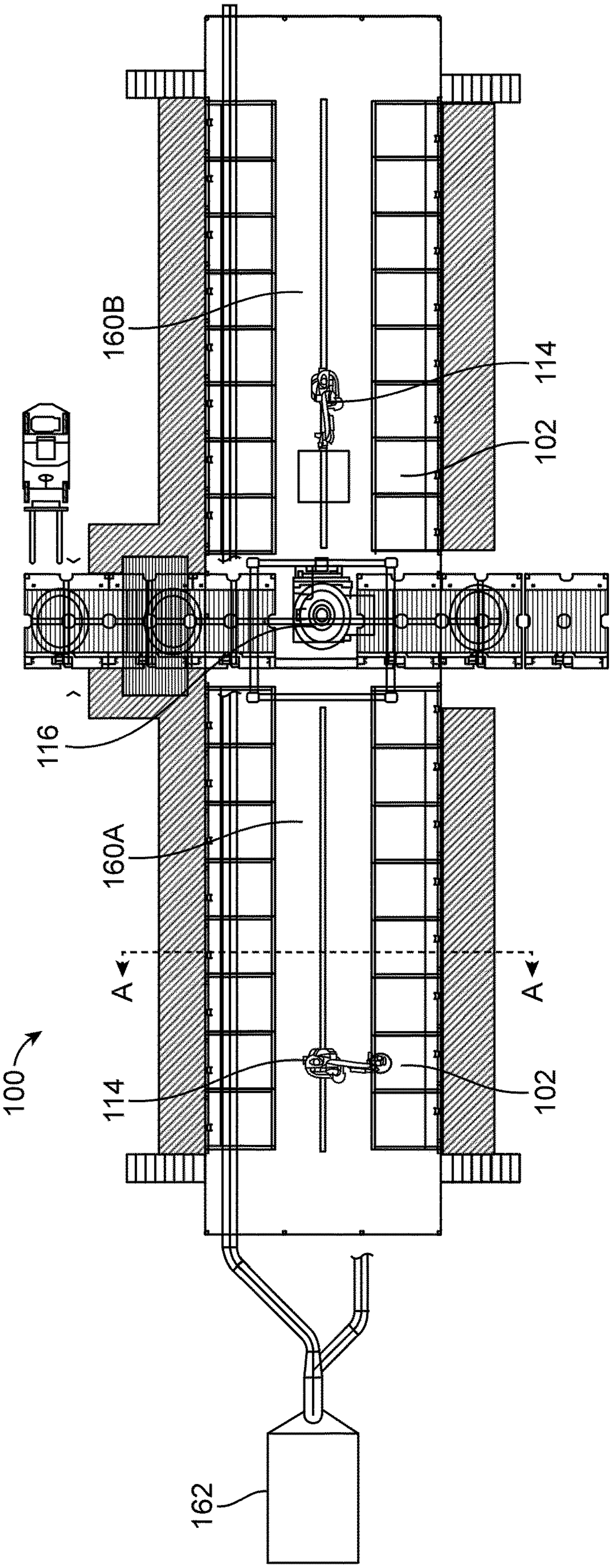
FIG. 7 is an architectural diagram depicting a precision powder coating batch system having two banks of storage bins, in accordance with an embodiment of the disclosure.

With reference to FIG. 7, in other embodiments, the precision powder coating batch system 100 can be configured as a large industrial application, with two or more banks 160A/B of storage bins 102. In some embodiments, the precision powder coating batch system 100 can include two banks 160A/B, which are mirror images of one another, thereby enabling the simultaneous preparation of at least two batches of powder coating. In other embodiments, the banks 160A/B can complement each other to include a more complete stock of raw materials. Accordingly, in some embodiments, raw materials from multiple banks 160 of storage bins 102 can be delivered to the mixing container 116 in the preparation of a single batch of powder coating.

In some embodiments, one or more dust collectors 162 can be configured to collect airborne particulate matter within the banks 160A/B or in proximity to the outlets 104 of the storage bins 102, thereby promoting housekeeping improvement within the precision powder coating batch system 100 as a further aid in reducing the likelihood of contamination of any given batch of powder coating being prepared. In some embodiments, a variety of environmental factors (e.g., temperature, humidity, etc.) can be controlled within each bank 160A/B of storage bins 102, thereby inhibiting caking of the raw materials, and ensuring desirable flow dispensing characteristics and accuracy in determined weights of the dispensed raw materials.

Figure 8:
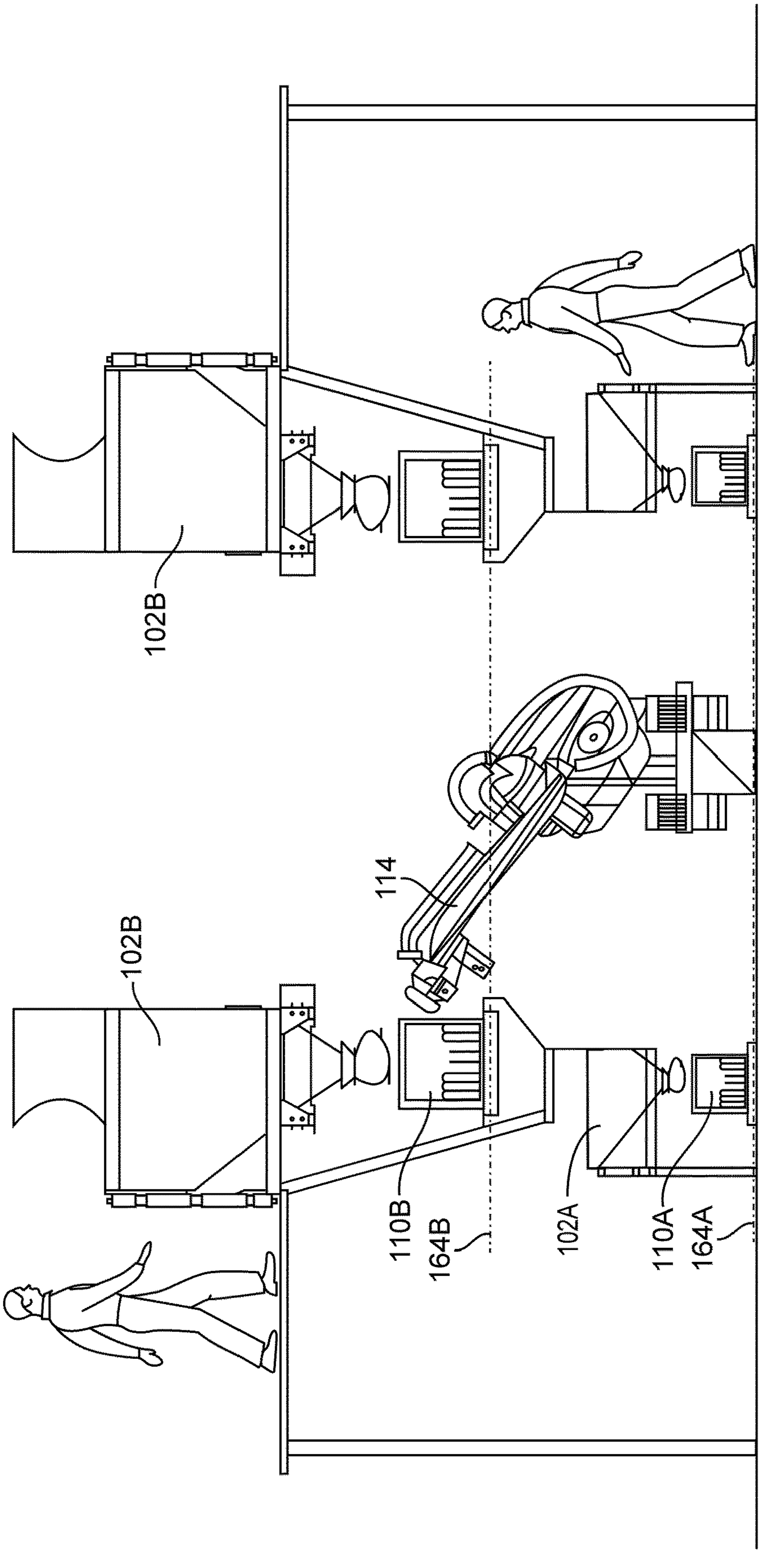
FIG. 8 is an elevation diagram depicting a multi-tiered structure of the precision powder coating batch system of FIG. 7 taken along line A-A in FIG. 7.

With additional reference to FIG. 8, in some embodiments, the precision powder coating batch system 100 can be vertically scalable as a multi-tiered system. For example, in one embodiment, the precision powder coating batch system 100 can include a first tier 164A and a second tier 164B; although the inclusion of additional tiers is also contemplated. In some embodiments, the first tier 164A can be configured to measure and sequence the transfer of desired quantities of raw material for the preparation of a first batch of powder coating, while a second tier 164B simultaneously measures and sequences the transfer of desired quantities of raw material for the preparation of a second batch of powder coating. Accordingly, in some embodiments, the precision powder coating batch system 100 is configured to simultaneously prepare multiple (potentially different) batches of powder coatings from a single bank 160 of storage bins 102, and within a given architectural footprint. In some embodiments, one tier 164A can be adapted to prepare small batches of powder coatings (e.g., less than about 50 pounds) using first tier storage bins 102A dispensing raw material into first tier raw material containers 110A, while the second tier 164B can be adapted to prepare larger batches of powder coatings (e.g., about 50 pounds or greater) using second tier storage bins 102B dispensing raw material into second tier raw material containers 110B.

In one or more embodiments, the storage bins 102A and raw material containers 110A on the first (lower) tier 164A may be located directly below the storage bins 102B and raw material containers 110B as seen in, e.g., FIGS. 7-8 (although that is not required). Also, although the larger storage bins 102B and raw material containers 110B are located above the smaller storage bins 102A and raw material containers 110A in the embodiment depicted in FIG. 8, one or more alternative embodiments may provide the larger storage bins and raw material containers on the lower tier 164A and smaller storage bins and raw material containers on the upper tier 164B. In one or more other alternative embodiments, the storage bins 102A on the first tier 164A and the storage bins 102B on the second tier 164B may have the same size (regardless of the size of the raw material containers into which the storage bins dispense raw material). In one or more other alternative embodiments, the raw material containers 110A on the first tier 164A and the raw material containers 110B on the second tier 164B may have the same size (regardless of the size of the storage bins dispensing raw material into the raw material containers).

Accordingly, in some embodiments, the use of a multi-tiered precision powder coating batch system 100 can be configured to promote a more economic preparation of smaller quantities of powder coatings, with lower labor requirements and fewer quality control issues.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A method of producing batches of powder coating materials, the method comprising:

dispensing a selected amount of a first raw material from a first storage bin into a first raw material container;

dispensing a selected amount of a second raw material from a second storage bin into a second raw material container;

transferring the first raw material from the first raw material container into a mixing container; and transferring the second raw material from the second raw material container into the mixing container;

wherein the first raw material and the second raw material are transferred into the mixing container in a transfer sequence selected to promote production of a homogeneous mixture comprising the first raw material and the second raw material in the mixing container, and wherein the first raw material is transferred into the mixing container such that the first raw material comprises a layer of the first raw material having a substantially uniform thickness in the mixing container.

2. The method of claim 1, wherein the second raw material is transferred into the mixing container such that the second raw material comprises a layer of the second raw material in the form of a cone.

3. The method of claim 2, wherein a center of the layer of the second raw material in the form of a cone comprises a thickness greater than the thickness of the layer of the second raw material at an edge of the layer proximate a wall of the mixing container.

4. The method of claim 1, wherein the first raw material is transferred into the mixing container such that the first raw material comprises a layer of the first raw material having a substantially uniform thickness in the mixing container, and wherein the second raw material is transferred into the mixing container such that the second raw material comprises a layer of the second raw material in the form of a cone.

5. The method of claim 4, wherein a center of the layer of the second raw material in the form of a cone comprises a thickness greater than the thickness of the layer of the second raw material at an edge of the layer proximate a wall of the mixing container.

6. The method of claim 1, wherein the method comprises:

dispensing a selected amount of a third raw material from a third storage bin into a third raw material container;

transferring the third raw material from the third raw material container into the mixing container before transferring the first raw material and the second raw material to promote production of a homogeneous mixture comprising the first raw material, the second raw material, and the third raw material in the mixing container.

7. The method of claim 6, wherein the third raw material is transferred into the mixing container before the first raw material such that the first raw material comprises a layer of the first raw material on the third raw material, and wherein the second raw material is transferred into the mixing container after the first raw material such that the second raw material comprises a layer of the second raw material on the first raw material in the form of a cone comprising a center having a thickness greater than a thickness of the layer of the second raw material at an edge of the layer proximate a wall of the mixing container.

8. The method of claim 7, wherein the layer of first raw material comprises a layer of the first raw material having a substantially uniform thickness in the mixing container.

9. The method of claim 6, wherein the third raw material is transferred into the mixing container such that the third raw material comprises a layer of the third raw material having a flat surface.

10. The method of claim 9, wherein the first raw material is transferred into the mixing container after the third raw material, and wherein the first raw material comprises a layer of the first raw material on the flat surface of the layer of the third raw material, the layer of the first raw material having a substantially uniform thickness above the third raw material in the mixing container, and wherein the second raw material is transferred into the mixing container such that the second raw material comprises a layer of the second raw material in the form of a cone.

11. The method of claim 10, wherein a center of the layer of the second raw material in the form of a cone comprises a thickness greater than the thickness of the layer of the second raw material at an edge of the layer proximate a wall of the mixing container.

12. A method of producing batches of powder coating materials, the method comprising:

dispensing a selected amount of a first raw material from a first storage bin into a first raw material container;

dispensing a selected amount of a second raw material from a second storage bin into a second raw material container;

transferring the first raw material from the first raw material container into a mixing container; and transferring the second raw material from the second raw material container into the mixing container;

wherein the first raw material and the second raw material are transferred into the mixing container in a transfer sequence selected to promote production of a homogeneous mixture comprising the first raw material and the second raw material in the mixing container;

and wherein the second raw material is transferred into the mixing container such that the second raw material comprises a layer of the second raw material in the form of a cone.

13. The method of claim 12, wherein the first raw material is transferred into the mixing container such that the first raw material comprises a layer of the first raw material having a substantially uniform thickness in the mixing container, and wherein the second raw material is transferred into the mixing container such that the second raw material comprises a layer of the second raw material in the form of a cone.

14. The method of claim 13, wherein a center of the layer of the second raw material in the form of a cone comprises a thickness greater than the thickness of the layer of the second raw material at an edge of the layer proximate a wall of the mixing container.

15. The method of claim 12, wherein the method comprises:

dispensing a selected amount of a third raw material from a third storage bin into a third raw material container;

transferring the third raw material from the third raw material container into the mixing container before transferring the first raw material and the second raw material to promote production of a homogeneous mixture comprising the first raw material, the second raw material, and the third raw material in the mixing container.

16. The method of claim 15, wherein the third raw material is transferred into the mixing container before the first raw material such that the first raw material comprises a layer of the first raw material on the third raw material, and wherein the second raw material is transferred into the mixing container after the first raw material such that the second raw material comprises a layer of the second raw material on the first raw material in the form of a cone comprising a center having a thickness greater than a thickness of the layer of the second raw material at an edge of the layer proximate a wall of the mixing container.

17. The method of claim 16, wherein the layer of first raw material comprises a layer of the first raw material having a substantially uniform thickness in the mixing container.

18. The method of claim 15, wherein the third raw material is transferred into the mixing container such that the third raw material comprises a layer of the third raw material having a flat surface.

19. The method of claim 18, wherein the first raw material is transferred into the mixing container after the third raw material, and wherein the first raw material comprises a layer of the first raw material on the flat surface of the layer of the third raw material, the layer of the first raw material having a substantially uniform thickness above the third raw material in the mixing container, and wherein the second raw material is transferred into the mixing container such that the second raw material comprises a layer of the second raw material in the form of a cone.

20. The method of claim 19, wherein a center of the layer of the second raw material in the form of a cone comprises a thickness greater than the thickness of the layer of the second raw material at an edge of the layer proximate a wall of the mixing container.

* * * * *